United States Patent [19]

Frick

[11] Patent Number: 5,523,819
[45] Date of Patent: Jun. 4, 1996

[54] EXPOSURE STATION FOR A PHOTOCOPIER

[75] Inventor: Beat Frick, Buchs, Switzerland

[73] Assignee: Gretag Imaging AG, Regensdorf, Switzerland

[21] Appl. No.: 292,270

[22] Filed: Aug. 18, 1994

[30] Foreign Application Priority Data

Aug. 25, 1993 [EP] European Pat. Off. ............ 93810610.1

[51] Int. Cl.⁶ .......................... G03B 27/72; G03B 27/76
[52] U.S. Cl. ............................................................. 355/71
[58] Field of Search ................................. 355/35, 70, 71

[56] References Cited

U.S. PATENT DOCUMENTS

| | | | |
|---|---|---|---|
| 3,684,371 | 8/1972 | Weisglass et al. | 355/71 |
| 4,053,222 | 10/1977 | Gandini | 355/71 |
| 4,368,974 | 1/1983 | Coote et al. | 355/35 |
| 4,432,636 | 2/1984 | Tarsia | 355/35 |
| 5,041,868 | 8/1991 | Suzuki | 355/68 |
| 5,057,864 | 10/1991 | Kijima et al. | 355/71 |
| 5,155,524 | 10/1992 | Oberhardt et al. | 355/68 |

FOREIGN PATENT DOCUMENTS

| | | |
|---|---|---|
| 3116858 | 1/1982 | Germany. |
| 4103995 | 8/1992 | Germany. |

*Primary Examiner*—Fred L. Braun
*Attorney, Agent, or Firm*—Burns, Doane, Swecker & Mathis

[57] ABSTRACT

An exposure station for a photocopier includes an illumination device positioned above a transport plane for a copy original, with a lamp as the source of the copy light, and a focusing hood positioned in the light path of the lamp between the lamp and the copy original. A projection lens system is positioned between the transport plane of the copy original and a transport plane for the copy material for reproducing the copy original on the copy material. By adjusting the projection lens system, for example, by selecting different lenses, it is possible to set different enlargement sizes. The luminance conditions of the copy light falling on the copy original can be adjusted to the enlargement size that has been set.

17 Claims, 3 Drawing Sheets

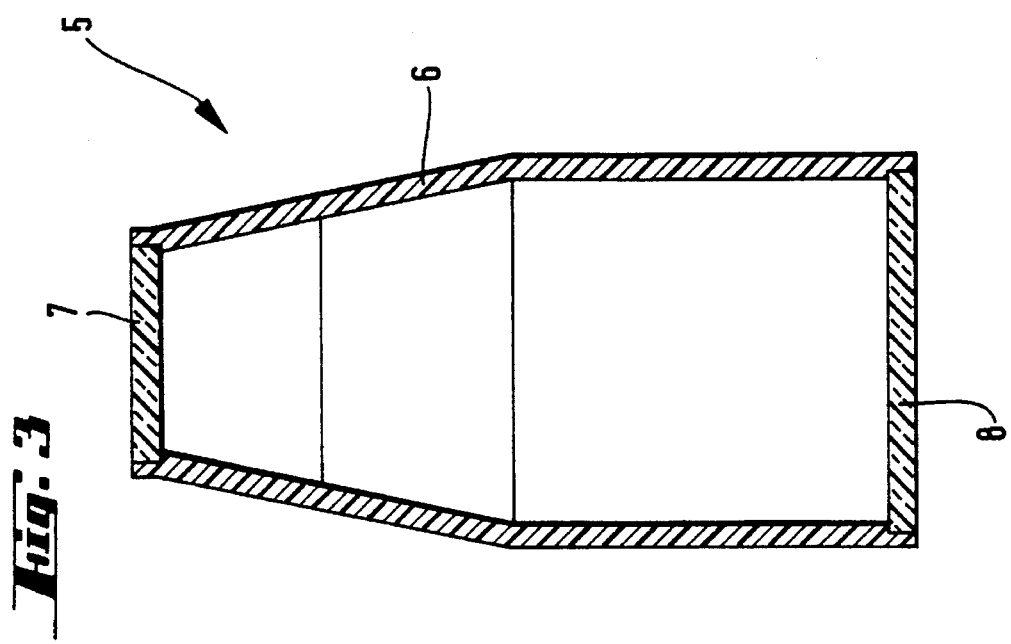
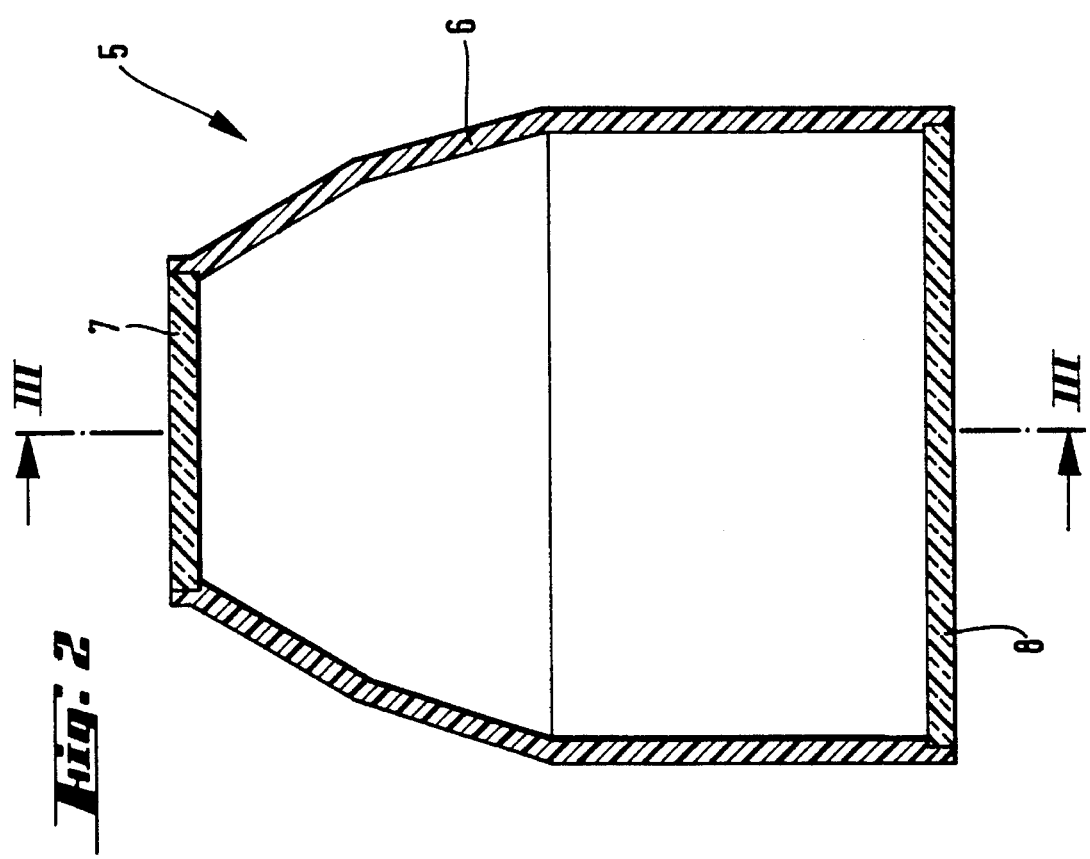

EXPOSURE STATION FOR A PHOTOCOPIER

BACKGROUND OF INVENTION

The invention relates to an exposure station for a photocopier wherein different enlargement sizes can be set and the luminance conditions of the copy light falling on the original can be adjusted.

Today the processing of photographic film, particularly negative film, and the production of the corresponding pictures is no longer perforated exclusively in large photo laboratories, but frequently occurs in a decentralized fashion. To an increasing degree, small photo and home electronics shops, pharmacies, and departments within supermarkets develop negatives and provide pictures of the desired format. Since the problem of available space is usually a consideration in these decentralized locations, compact processing equipment is desirable. At the same time, the processing equipment should permit diverse application and make it possible to prepare different picture formats from negatives that are often of a small film format.

In the optical reproduction system of a photocopier the illumination strength in the picture plane is inhomogeneous given a precisely homogeneous illumination of the transparent original. From the center of the picture to the rim of the picture, the strength of illumination decreases according to a $\cos^4$ law of the picture angle. The picture angle is defined as the angle between the line defined by a point on the negative and the corresponding picture point on the picture plane and the optical axis. In known copiers the distance between the negative and the picture plane is usually relatively large and ranges from about 500 mm to about 800 mm. For these relatively large distances there are generally relatively small picture angles. In addition, large devices, particularly high capacity printers, are usually not equipped to deal with a large number of different picture formats, since their purpose is mainly the rapid processing and production of a large number of pictures of a single format. In these copiers the same maximum picture angle occurs due to the fixed size of enlargement. For such copiers, the problem of rim diminution is consequently a "static" one, which can be resolved by a suitable design of the lens system, for example with a condenser. This achieves a controlled degree of rim enhancement for the illumination strength, which is intended to compensate for rim diminution. Copiers are also known that are suited for differing picture formats. In these devices, interchangeable condensers are provided which are intended to accommodate different degrees of rim diminution. However, interchangeable condensers, and even illumination units, are relatively expensive and are sometimes also large in design.

In the compact copiers two factors contribute to increasing the difficulty of rim diminution. The demanded compactness of the copier requires that the distance between the negative and the picture plane be reduced, for example, to about 400 mm. At the same time, the compact photocopier should be able to produce pictures of 3.5"×5" to 6"×9" format from negative originals. For originals of the small 24 mm×36 mm format, where the distance between the focusing lens and the original ranges between 40 mm for a large enlargement to 80 mm for a small enlargement, the naturally arising diminution in illumination strength at the picture rim is 40% and 13%, respectively. The correct picture exposure of an original requires a rim diminution of only 5% to 15%, however. If these limit values are exceeded in either direction, the different illumination strengths become visible in the center and edge of the picture and the result is a picture that creates the impression of incorrect lighting during picture-taking.

In contrast to high capacity printers, the problem of rim diminution in the illumination strength arises in the compact copiers as a "dynamic" problem. Thus, the problem of rim diminution in the illumination strength remains to be solved in photocopiers, particularly those of compact design. Specifically, it should be possible to compensate in a controlled fashion for the differing degrees of rim diminution for different picture formats or enlargement sizes and to allow the copier to quickly adjust for the changed conditions. The solution should be simple and permit a savings in space. In addition, it should be cost effective in implementation.

SUMMARY OF INVENTION

An object of the present invention is to overcome the above-identified deficiencies in the prior art by providing an exposure station for a photocopier with means for setting different enlargement sizes and for adjusting the luminance conditions of the copy light falling on the original according to the desired enlargement size. According to an exemplary embodiment of the invention the exposure station comprises an illumination device, with a lamp as a copying light source, positioned above a transport plane for a copy original. A focusing hood is positioned between the lamp and the copy original in the light path, and a projection lens system is positioned between the transport plane of the copy original and the transport plane of the copy material for reproducing the copy original on the copy material. By adjusting the projection lens system, for example by selection of the different lenses, different enlargement sizes can be set. On the light-outlet side of the focusing hood, means are provided to adjust the luminance conditions of the copy light falling on the copy original to the enlargement size that has been set. In this manner the illuminating device can be very simply adjusted to compensate for the rim diminution in illumination strength in the picture plane, which varies considerably according to different enlargement sizes.

On the light-outlet side, the focusing hood houses a focusing screen, which diffusely scatters the incident copy light according to Lambert's law and whose transmission properties can be adjusted to the given enlargement size by luminance adjusting means on the light-outlet side. This assures that the incoming light is optimally scattered, while the luminance provided by the diffusely radiating screen closely approximates Lambert's cosine law, and assures that the original is illuminated in the desired manner. Consequently, it is no longer necessary to exchange the copy light source in meeting the illumination requirements that vary according to the enlargement size.

The shape of the focusing hood can be selected in such a way that the copy original is completely illuminated, certain directions in the incoming copying light can be attenuated, and the luminance of the radiated light at the center of the focusing screen can be as large as possible for the given lamp output and increases from the center to the rim of the illuminated area of the focusing screen, where, e.g., it is about 25% larger than in the center. In this manner, rim diminution occurring at greater enlargement sizes can be successfully compensated for, even with a focusing screen with homogeneous transmission.

The focusing screen on the light-outlet side can preferably exhibit a homogeneous transmission that can be influenced by the light-outlet side luminance adjusting means in such a way that the transmission decreases radially and outwardly from an unchanged central area. For example, the transmission at the rim of the illuminated area of the focusing screen can be about 85% of the transmission in the central area of the focusing screen. In this manner the illumination conditions can be adjusted to small and medium enlargement sizes and the natural rim diminution can be compensated for.

An especially simple embodiment of the lumination adjusting means on the light-outlet side is represented by a dot screen with locally variable dot sizes. Here the local variation in dot size is preferably such that the rim diminution in the copying light on the copying material is 5% for the smallest enlargement size. In this manner it is assured that the rim diminution remains at an acceptable level.

In a structurally more elaborate but very elegant embodiment of the invention, the dot screen can be easily swung into the light ray path of the copying light on the light outlet side of the focusing hood. In a preferred embodiment of the invention, the illumination device of the exposure station comprises an aggregate of at least two focusing hoods, which can be interchanged to adjust the illumination conditions on the original as appropriate for the given enlargement size and which are structurally identical except for the transmission properties of the focusing screen on the light-outlet side. In this manner it is possible to very simply adjust the illumination device to the rim diminution, in illumination strength on the picture plane, which varies considerably for different enlargement sizes. By equipping the illumination device with a set of focusing hoods it is possible to quickly adjust the illumination conditions to the modified requirements, simply by changing and setting a suitable focusing hood. The flexibility of the illumination device is thereby enhanced considerably.

In an exemplary embodiment of the invention, the set of focusing hoods can include an initial focusing hood, whose outlet side focusing screen has a homogeneous transmission, and at least one other structurally identical focusing hood, whose outlet side focusing screen has a transmission which decreases radially from the center to the outer edge of the focusing screen and which, in the central area of the focusing screen, equals about 100% of the transmission of the outlet side focusing screen of the first focusing hood and equals about 85% in the rim area. The first focusing hood can be designed to compensate for the rim diminution in large size enlargements. The radial inhomogeneity of transmission of the outlet side focusing screen of the second focusing hood can be sufficient to compensate for the rim diminution occurring in small and medium enlargements.

The radial inhomogeneity of transmission of the light-outlet side focusing screen of the second focusing hood can be achieved by providing this focusing hood with a preferably black dot screen with locally variable dot size. The dot screen can be produced in a particularly simple manner by impressing it on the side of the focusing screen that faces the lamp, in a grid with a spacing of about 2 mm, preferably using a screen printing process.

A material that is particularly suited for the outlet side focusing screen is polymethylmethacrylate (plexiglass) with a thickness of about 2 mm to about 4 mm, preferably about 3 mm, which exhibits a diffusion power of at least 0.50 and a transmission factor of at least 40%. Such materials have adequate to good transmissions and have diffusion properties that closely approximate Lambert's law. A thickness of 3 mm is preferred since this thickness is used in standardized material tests with respect to transmission and diffusion behavior. These published and tabulated values permit a direct comparison of various materials. Preferably each focusing hood can include a housing that is a plastic injection molded part, whose inner facing walls are metal-coated with aluminum and are vaporized, if so desired, with silicon dioxide, or are otherwise coated so as to be reflective. Focusing hoods of this type can be simply and cost-effectively produced in the desired forms.

BRIEF DESCRIPTION OF THE DRAWINGS

Other objects and advantages of the present invention will become apparent from the following description of preferred embodiments of the invention as described in conjunction with the accompanying drawings, wherein like reference numerals are applied to like elements, and wherein:

FIG. 2 shows a focusing hood in front view;

FIG. 3 shows a focusing hood in side view; and

DETAILED DESCRIPTION OF THE PREFERRED EMBODIMENTS

Figure 1:
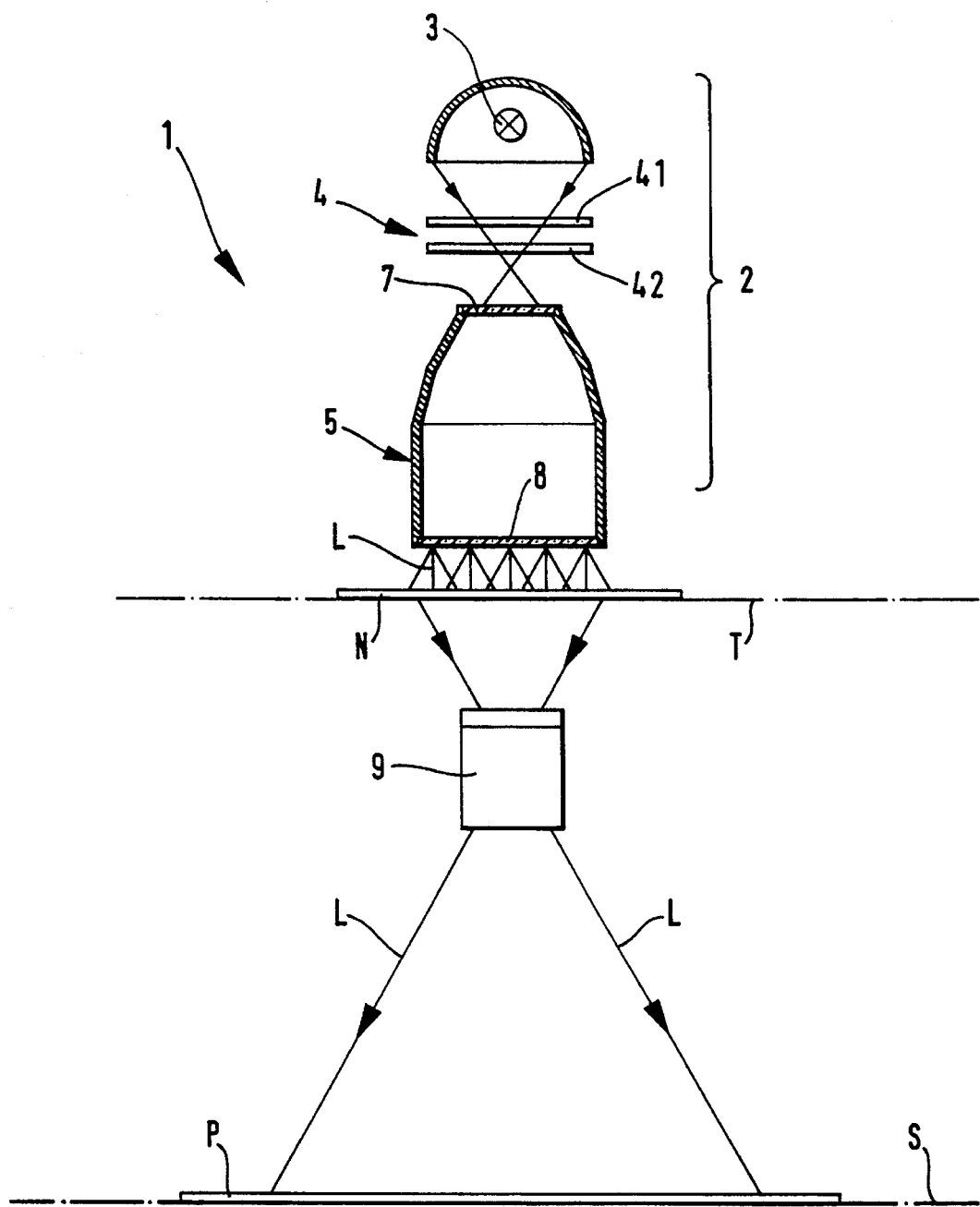
FIG. 1 shows an exposure station of a photocopier with an illumination device according to the invention.

In FIG. 1 an exposure station of a photocopier is schematically depicted and is designated in its entirety by reference symbol 1. This kind of exposure station 1 is usually positioned next to a measuring station, in which the originals are scanned with measuring light according to area and the transmitted or diffused measuring light is analyzed. In the case of color originals, color extract values are established in an attached computer unit, and given criteria employ these values to determine the necessary quantities of copy light in the three basic colors of red, green, and blue. By means of these established quantities of copy light, copies of the photographic originals, usually negative film, are exposed on photographic copy material, usually photographic paper, in the exposure station 1.

The exposure station 1 comprises an illumination device 2 positioned above a transport plane T for the copy original N, and a projection lens system 9, which is located below the transport plane T for the copy original N, in the ray path of the copy light L. The transport plane T for the copy original is determined by the film platform on the photocopier. The projection lens system 9 is equipped with a plurality of projection lenses, by means of which different enlargements of the copy original can be set on the photographic copy material P; the copy material P is advanced in a transport plane S below the film platform. In an exemplary embodiment of the present invention the maximum adjustable spacing between the projection lens system and the copy original is about 100 mm. Naturally those areas of the photocopier through which the photosensitive copy material P is moved are partitioned off against ambient light. The copy material P is exposed only in that area which is fed by copy light L. The projection lens system 9 is equipped with different projection lenses with focal lengths ranging from about 35 mm to about 66 mm, though it may also comprise a lens system with a continuously adjustable focal length.

The illumination device 2 positioned above the transport plane T for the copy original N comprises a lamp 3 with a reflector and condenser, a filter configuration 4 located between the lamp and focusing hood in the ray path of the copy light L, and an adjoining focusing hood 5, which extends almost to the film platform. The copy light source 3 is usually a halogen metal oxide vaporized reflector lamp.

The filter configuration 4 can comprise an infrared stop filter 41 and a color filter wheel 42 for exposure in the three basic colors. The focusing hood 5 houses a focusing screen 7 and 8 on both the light-inlet side and the light-outlet side. The distance between the light-outlet side focusing screen 8 and the copy original N transported along the transport plane T is, e.g., about 20 mm.

According to the invention, the illumination device comprises an aggregate of interchangeable focusing hoods 5 for adjusting the illumination conditions of the copy original N in accordance with the enlargement size that is set by adjustment of the projection lens system 9. In the same fashion it is possible to adjust illumination conditions to the given format for the copy original (full format, half-format). Thus, the rim diminution, which differs considerably for the various enlargement sizes, can be easily compensated by selecting a suitable focusing hood 5 from the set and inserting it in the ray path of the copy light source 3. The different illumination conditions are created by giving the focusing hoods a special design, together with the light outlet areas of the focusing hoods. One skilled in the art will recognize that it is particularly advantageous that all the focusing hoods are structurally identical except for the light outlet area. Simple clamping or screwing devices (not shown) can be provided at appropriate locations in the exposure station, to which devices the housing 6 (FIGS. 2 and 3) of the given focusing hood 5 can be attached. This also permits simple and cost-effective production of the focusing hoods. For example, only a single injection mold is necessary. This reduces startup costs and facilitates storage. In addition, the identical design of the focusing hoods allows the processing to be automated, which also lowers cost.

FIGS. 2 and 3 show a preferred embodiment of a focusing hood 5 in front and side views. The front view runs parallel to the direction of transport of the copy original N and perpendicular to the transport plane T. The side view runs perpendicular to the transport direction and to the transport plane T. The focusing hood includes a housing 6 which can be made of plastic, and whose facing inner walls are metal-coated. The plastic housing 6 is preferably produced by means of injection molding. The inner walls are preferably coated with aluminum and, if so desired, are vaporized with silicon dioxide or otherwise coated so as to be reflective. Each focusing hood is equipped with a focusing screen 7 and 8 located on the light-inlet side and the light-outlet side, respectively. The material, particularly for the light-outlet side focusing screen 8, is selected in such a way that it diffusely scatters the copy light L falling on it in accordance with Lambert's law. A particularly suitable material for the focusing screens 7, 8 is polymethylmethacrylate (plexiglass) with a thickness ranging from about 2 mm to about 4 mm, preferably about 3 mm. Care must taken to assure that the plexiglass type employed, particularly for the light-outlet side focusing screen, has a diffusion power of at least about 0.57 and a transmission factor of at least about 44%.

Figure 4:
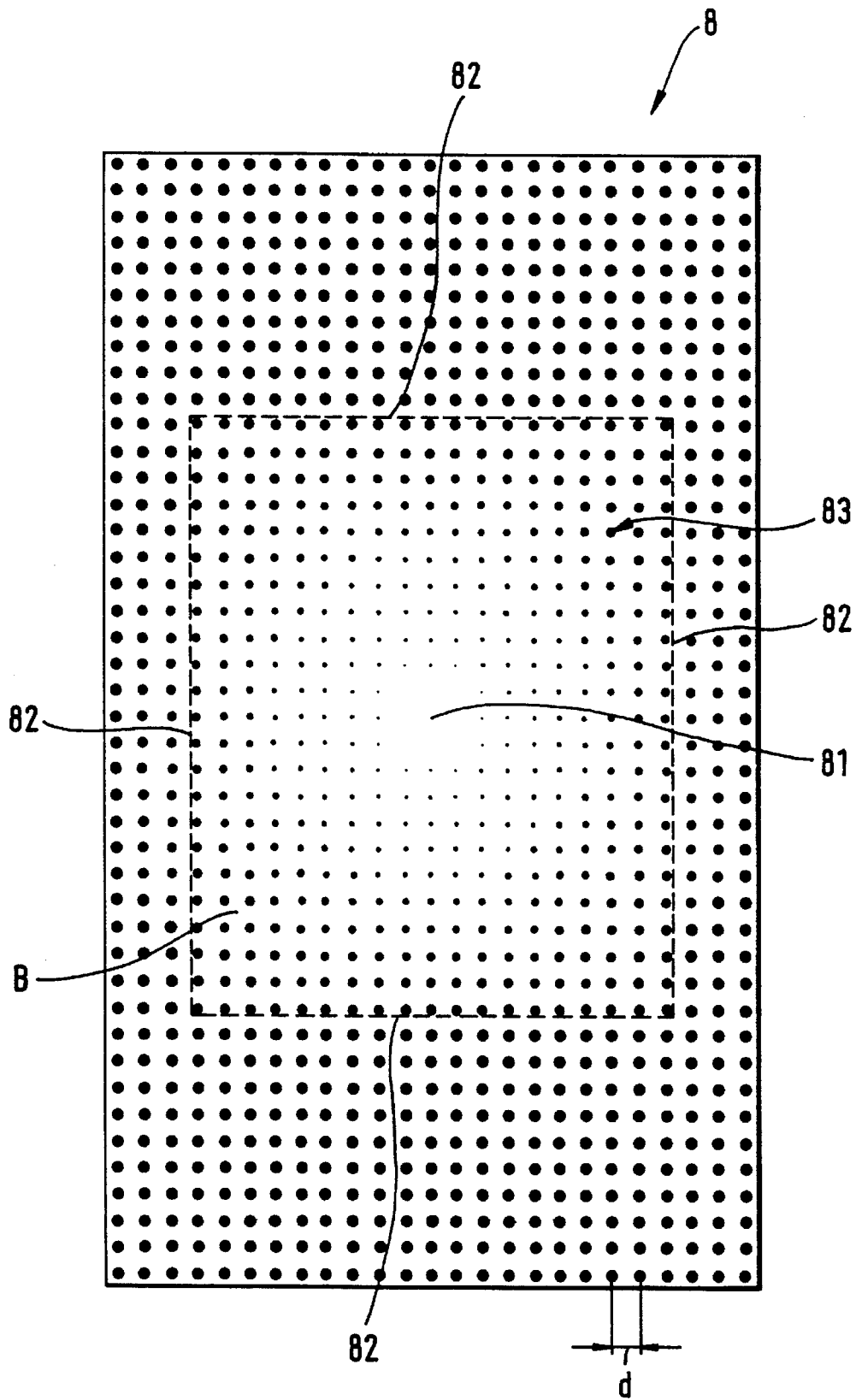
FIG. 4 shows a focusing screen with a dot screen.

The shape of the housing 6 for the focusing hood 5 can be identical for all focusing hoods of the set and is such that the original is completely illuminated and certain directions in the incoming copy light L are attenuated. At the same time, the shape of the housing 6 assures that the luminance of the incoming copy light L is as large as possible in the center of the outlet side focusing screen 8, given the lamp output, and that it increases from the center 81 to the rim 82 of the illuminated area of the focusing screen, where it is, e.g., about 25% greater than in the center 81 (FIG. 4). The illuminated area of the focusing screen corresponds here, at a minimum, to the dimensions of the original, particularly a negative original of a small picture film.

In an exemplary embodiment of the present invention, the housing 6 of the depicted focusing hood 5 has a total height of about 110 mm. It has the approximate shape of a multiple angled pyramidal frustram with a rectangular base. In the area of the focusing screen 7 on the light-inlet side the housing has a length of 44.2 mm and a width of 30.4 mm. On the light-outlet side the housing 6 has a length of 85 mm and width of 50 mm. The dimensions with respect to length and width refer to the distances between the inner walls of the housing 6. The height of the cuboid part of the housing 6 is 52 mm. A set of interchangeable focusing hoods includes a minimum of two focusing hoods. A focusing hood for compensating the rim diminution of copy light L in the case of large enlargement sizes is provided, along with a second focusing hood for comparable compensation in the case of small and medium enlargement sizes. The two focusing hoods differ with respect to the transmission characteristics of the focusing screen 8 on the light-outlet side. The light-outlet side focusing screen 8 of the first focusing hood has an homogeneous transmission, while the transmission of the light-outlet side focusing screen 8 of the structurally identical second focusing hood decreases radially from the center 81 to the rim 82 of the illuminated area B of the focusing screen 8 in FIG. 4. In the central area 81 the transmission is about 100% of the transmission of the light-outlet side focusing screen 8 of the first focusing hood. In the rim area 82 the transmission is still about, e.g., 85% of the transmission of the light-outlet side focusing screen 8 of the first focusing hood.

In an exemplary embodiment according to FIG. 4 the light-outlet side focusing screen 8 of the second focusing hood is provided with a black dot screen 83, with locally variable dot sizes. It is preferable to impress the dot screen 83 on the side of the light-outlet side focusing screen 8 that faces the lamp. Screen process printing is a particularly suitable method for producing the dot screen 83. The dots may be printed in a square grid with a spacing d of 2 mm. Given a dot size of r, the absorption "a" provided by a grid cell is: $a = \pi \cdot r^2 / d^2$, which corresponds to the ratio of the printed absorptive surface to the total area of the grid cell. An absorption degree of about 10% is achieved with a dot size of r=0.36 mm. The local absorption is described by a two-dimensional function: a(x,y), where x,y are the coordinates of a dot on the light-outlet side focusing screen 8 over the length (x= −42.5 mm . . . x=42.5 mm) and width (y=−25 mm . . . y=25 mm) of the focusing screen. The dot x=0, y=0 describes the center of the focusing screen. Absorption in the center is 0, which gives a dot size of 0. Absorption increases continuously as the rim of the illuminated area B of the focusing screen is approached radially. The illuminated area is indicated in FIG. 4 by the broken line. It will generally correspond to the dimensions of the copy original N. The local variation in the dot size of the dot screen 83 is established in such a way that for the smallest enlargement the resulting dot screen 83 brings about a 5% rim diminution in illumination in the plane of the copy material P.

It is understood that the dot screen 83 does not have to be printed directly on the light-outlet side focusing screen 8. The dot screen 83 can also be applied to a separate transparent sheet, which is applied to the focusing screen 8. In this case the transmission characteristics of the focusing screens of the first and second focusing hoods will preferably be identical. A set of interchangeable focusing hoods can also include more than two focusing hoods with different dot screens 83 in the light-outlet side area. An exposure station can also be furnished with an absorptive element provided with a dot screen 83, with an absorptive capability that increases from the center to the rim, that can be swung into the light path of the copy light L. In this case a single focusing hood is sufficient. Here the transmission characteristics of the light-outlet side focusing screen 8 of the focusing hood 5 correspond to those of the first focusing hood for large enlargements, given a set of focusing hoods. An inventive design of the exposure station can also be applied in illumination devices that do not produce rim enhancement. In this case a modified aggregate of focusing hoods is required. For large size enlargements the light-outlet side focusing screen 8 should have a large degree of absorption in the center 81, while a low degree of absorption can be used in the rim area of the illuminated zone B of the focusing screen. For small enlargement sizes, as little absorption as possible can be used in the central area 81 of the light-outlet side focusing screen 8. In this case a set of focusing hoods would comprise an initial focusing hood for small and medium enlargements, one whose light-outlet side focusing screen has an homogeneous and maximum transmission, as well as at least one other focusing hood, whose light-outlet side focusing screen 8 exhibits a large degree of absorption in the central area 81 that radially decreases in continuous fashion from the center outward to the rim 82 of the illuminated area B of the focusing screen 8. In the case of an embodiment with a single focusing hood 5 the focusing hood comprises a light-outlet side focusing screen 8 with a maximum homogeneous transmission, as well as, e.g, a transparent sheet that can be inserted on the light-outlet side in the light path L of the copy light source 3, with a dot screen 83 which provides a maximum absorption in the central area 81 that radially decreases in continuous fashion outwardly to the rim 82 of the illuminated area B of the light-outlet side focusing screen 8.

The design provided by the invention for the photocopier exposure station makes it possible to fulfill in a simple fashion the various illumination requirements that arise for different enlargement sizes. Rim diminution in the copy light can be compensated for by appropriate modification of the transmission characteristics of the light-outlet side focusing screen of the focusing hood. This solution is cost-effective and space-saving and thus is particularly suited for use in compact photocopiers.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. An exposure station for a photocopier, comprising;
   an illumination device positioned above a transport plane for a copy original, with a lamp providing a source of copy light;
   a focusing hood positioned in a light path of the lamp between the lamp and the transport plane;
   a projection lens system, positioned between the transport plane of the copy original and a transport plane for copy material, for reproducing the copy original on the copy material and for setting different enlargement sizes; and
   adjusting means provided on a light-outlet side of the focusing hood to adjust luminance conditions of the copy light falling on the transport plane of the copy original to a desired enlargement size, wherein the adjusting means on the light-outlet side is a black dot screen with a locally variable dot size.

2. A device according to claim 1, wherein the focusing hood houses a focusing screen on the light-outlet side which diffusely scatters incoming copy light from said lamp in accordance with Lambert's law and which has transmission characteristics adjusted to the desired enlargement size by the adjusting means.

3. A device according to claim 2, wherein the shape of the focusing hood is shaped such that the copy original is completely illuminated, preferential directions of the incoming copy light are suppressed, and the luminance of the incoming light is relatively large in a center of the focusing screen for a given lamp output, and increases from the center to a rim of the illuminated area of the focusing screen, said luminance being about 25% higher at said rim than in the center.

4. A device according to claim 3, wherein the light-outlet side focusing screen has a homogeneous transmission which is modified by said adjusting means positioned on the light-outlet side such that the transmission decreases radially and outwardly from an unmodified central area to the rim of the illuminated area of the focusing screen, where the transmission is approximately 85% of the transmission in the central area of the focusing screen.

5. A device according to claim 4, wherein the local variation of dot size in the dot screen is such that there is a rim diminution in the copy light of 5% given a minimum enlargement size.

6. A device according to claim 5, wherein the dot screen can be swung into the light path of the copy light on the light-outlet side of the focusing hood.

7. A device according to claim 5, wherein the illumination device includes at least two focusing hoods which can be interchanged to adjust illumination conditions of the copy original to the desired enlargement size and which are structurally identical except for the transmission characteristics of the focusing screen on the light-outlet side.

8. A device according to claim 7, wherein the at least two focusing hoods include an initial focusing hood whose light-outlet side focusing screen has a homogeneous transmission, and at least one other structurally identical focusing hood whose light-outlet side focusing screen exhibits a degree of transmission that radially decreases from the center to the rim of the illuminated area of the focusing screen, and that is equal to about 100% of the transmission of the light-outlet side focusing screen of the initial focusing hood in the central area of the focusing screen and about 85% in the rim area.

9. A device according to claim 8, wherein the light-outlet side focusing screen of the at least one other focusing hood is provided with a dot screen of locally variable dot size.

10. A device according to claim 8, wherein the dot screen is impressed by a screen printing process on a side of the light-outlet side focusing screen facing the lamp to form a grid with a spacing of about 2 mm.

11. A device according to claim 10, wherein each light-outlet side focusing screen includes a plate of polymethylmethacrylate which has a thickness ranging from about 2 mm to about 4 mm, and which exhibits a diffusion power of at least 0.57 and a transmission factor of at least 44%.

12. A device according to claim 11, wherein each focusing hood comprises a housing of plastic injection molded material, whose inner walls are metal-coated with aluminum and coated in reflecting fashion.

13. A device according to claim 2, wherein the light-outlet side focusing screen includes a plate of polymethylmethacrylate which has a thickness ranging from about 2 mm to about 4 mm, and which exhibits a diffusion power of at least 0.57 and a transmission factor of at least 44%.

14. A device according to claim 2, wherein the focusing hood comprises a housing of plastic injection molded material, whose inner walls are metal-coated with aluminum.

15. A device according to claim 14, wherein said inner walls are vaporized with silicon dioxide.

16. A photocopier for copying photographic copy originals on photographic copy material, said photocopier having an exposure station which comprises:

an illumination device positioned above a transport plane for a copy original, with a lamp providing a source of copy light;

a focusing hood positioned in a light path of the lamp between the lamp and the transport plane;

a projection lens system, positioned between the transport plane of the copy original and a transport plane for copy material, for reproducing the copy original on the copy material and for setting different enlargement sizes; and adjusting means provided on a light-outlet side of the focusing hood to adjust luminance conditions of the copy light falling on the transport plane of the copy original to a desired enlargement size, wherein the adjusting means on the light-outlet side is a black dot screen with a locally variable dot size.

17. An exposure station for a photocopier, comprising;

an illumination device positioned above a transport plane for a copy original, with a lamp providing a source of copy light;

a focusing hood positioned in a light path of the lamp between the lamp and the transport plane;

a projection lens system, positioned between the transport plane of the copy original and a transport plane for copy material, for reproducing the copy original on the copy material and for setting different enlargement sizes; and adjusting means provided on a light-outlet side of the focusing hood to adjust luminance conditions of the copy light falling on the transport plane of the copy original to a desired enlargement size, wherein the light-outlet side of the focusing hood includes a plate of polymethylmethacrylate which has a thickness ranging from about 2 mm to about 4 mm, and which exhibits a diffusion power of at least 0.57 and a transmission factor of at least 44%.

* * * * *